United States Patent
Hu et al.

(10) Patent No.: US 11,902,876 B2
(45) Date of Patent: Feb. 13, 2024

(54) ROUTING MANAGEMENT METHOD AND APPARATUS

(71) Applicant: HUAWEI TECHNOLOGIES CO., LTD., Guangdong (CN)

(72) Inventors: Xiang Hu, Beijing (CN); Yuan Xia, Beijing (CN); Wenqi Cui, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 396 days.

(21) Appl. No.: 17/243,751

(22) Filed: Apr. 29, 2021

(65) Prior Publication Data
US 2021/0250844 A1 Aug. 12, 2021

Related U.S. Application Data

(63) Continuation of application No. PCT/CN2019/114274, filed on Oct. 30, 2019.

(30) Foreign Application Priority Data
Oct. 30, 2018 (CN) .......................... 201811279680.X

(51) Int. Cl.
*H04W 40/24* (2009.01)
*H04W 4/23* (2018.01)
*H04W 8/28* (2009.01)

(52) U.S. Cl.
CPC ........... *H04W 40/248* (2013.01); *H04W 4/23* (2018.02); *H04W 8/28* (2013.01); *H04W 40/24* (2013.01)

(58) Field of Classification Search
CPC ......... H04W 4/23; H04W 40/24; H04W 8/28; H04W 40/248; H04L 45/74; H04L 61/5007
See application file for complete search history.

(56) References Cited

U.S. PATENT DOCUMENTS

| 2011/0099293 A1 | 4/2011 | Ait-Ameur et al. |
| 2013/0007233 A1* | 1/2013 | Lv ....................... H04L 61/5038 709/222 |

(Continued)

FOREIGN PATENT DOCUMENTS

| CN | 101202968 A | 6/2008 |
| CN | 106993067 A | 7/2017 |

(Continued)

OTHER PUBLICATIONS

Huawei et al.,"Evaluation for the solution 10",SA WG2 Meeting #128 S2-187026, Jul. 2-6, 2018,Total 4 Pages.

Nokia et al.,"23.501 § 5.8: IP address allocation for a PDU session and forwarding realms", SA WG2 Meeting #122 S2-175040, Jun. 26-30, 2017,Total 4 Pages.

(Continued)

*Primary Examiner* — Oussama Roudani

(57) ABSTRACT

Embodiments of this application disclose a routing management method, used to advertise an address segment routing policy. The method in the embodiments of this application includes: A control plane function assigns an internet protocol IP address to user equipment. The control plane function determines an IP address segment, where the IP address belongs to the IP address segment. The control plane function sends information used to identify the IP address segment to a user plane function, where the IP address segment is used to advertise a routing policy.

11 Claims, 6 Drawing Sheets

(56) References Cited

U.S. PATENT DOCUMENTS

| | | | | |
|---|---|---|---|---|
| 2014/0153577 A1* | 6/2014 | Janakiraman | ....... | H04L 49/3009 |
| | | | | 370/392 |
| 2016/0226754 A1* | 8/2016 | Zhang | ..................... | H04L 45/42 |
| 2020/0220802 A1* | 7/2020 | Goliya | .................. | H04L 45/021 |
| 2023/0208755 A1* | 6/2023 | Ravinoothala | .......... | H04L 45/64 |
| | | | | 370/254 |

FOREIGN PATENT DOCUMENTS

| | | |
|---|---|---|
| CN | 108307401 A | 7/2018 |
| WO | 2017078776 A1 | 5/2017 |
| WO | 2018161281 A1 | 9/2018 |

OTHER PUBLICATIONS

3GPP TR 23.726 V0.3.0 (Apr. 2018); 3rd Generation Partnership Project;Technical Specification Group Services and System Aspects;Study on Enhancing Topology of SMF and UPF in 5G Networks(Release 16),Total 52 Pages.

Extended European Search Report dated Nov. 22, 2021 issued in European Application No. 19879249.1 (13 pages).

3GPP TS 29.244 V15.1.0 (Mar. 2018), 3rd Generation Partnership Project; Technical Specification Group Core Network and Terminals;Interface between the Control Plane and the User Plane Nodes;Stage 3(Release 15), 170 pages.

International Search Report dated Jan. 23, 2020 issued for International Application No. PCT/CN2019/114274 (9 pages).

Office Action dated Oct. 12, 2020 issued in Chinese Application No. 201811279680.X (7 pages).

\* cited by examiner

ROUTING MANAGEMENT METHOD AND APPARATUS

CROSS-REFERENCE TO RELATED APPLICATIONS

This application is a continuation of International Application No. PCT/CN2019/114274, filed on Oct. 30, 2019, which claims priority to Chinese Patent Application No. 201811279680.X, filed on Oct. 30, 2018. The disclosures of the aforementioned applications are hereby incorporated by reference in their entireties.

TECHNICAL FIELD

This application relates to the field of communications technologies, and in particular, to a routing management method and an apparatus.

BACKGROUND

A routing policy is a flexible data packet forwarding mechanism. It is a common routing policy that determines how to forward a data packet that needs to be routed based on a destination address. If the routing policy is advertised based on an internet protocol (IP) address, routing policy specifications are too large. Therefore, the routing policy is advertised based on an IP address segment.

In the prior art, in a scenario architecture in which a user plane (UP) is separated from a control plane (CP), a user plane function and a control plane function usually agree on a mask length of a route, the user plane function advertises a routing policy of an IP address segment based on the agreed mask length.

Usually, one user plane function is associated with a plurality of control plane functions, and one user plane function and one control plane function are associated with one or more IP address segments. For the one user plane function, when a mask length of an IP address segment in a plurality of IP address segments associated with the user plane function is inconsistent with the agreed mask length of an advertised routing policy, that is, a range of an associated IP address segment is inconsistent with a range of the IP address segment of the advertised routing policy, route advertisement of some IP addresses is disordered. For example, when the user plane function receives data that should be sent to another user plane function, routing policies of some users are abnormal.

SUMMARY

The embodiments of this application provide a routing management method, to facilitate management of an address segment routing policy.

A first aspect of the embodiments of this application provides a routing management method, including: A control plane function assigns an internet protocol IP address to user equipment. The control plane function determines an IP address segment, where the IP address belongs to the IP address segment. The control plane function sends information used to identify the IP address segment to a user plane function, where the IP address segment is used to advertise a routing policy.

When the user equipment initiates a session establishment process, the control plane function selects the user plane function for the user equipment, and assigns the IP address to the user equipment. After the control plane function determines the IP address segment used to assign the IP address to the user equipment, the control plane function may send the IP address segment to the user plane function, and the user plane function may advertise the routing policy based on the IP address segment. In this way, the user plane function receives and processes a packet that is sent to a destination address and that belongs to the IP address segment. This avoids abnormal routing policies of some users caused by inconsistency between a mask length of the IP address segment assigned by the control plane function and an agreed mask length of an advertised routing policy.

In a possible implementation of the first aspect, that the control plane function sends information used to identify the IP address segment to a user plane function includes: The control plane function sends the IP address and an IP address mask to the user plane function.

According to the routing management method provided in the embodiments of this application, a specific manner in which the control plane function sends the information used to identify the IP address segment to the user plane function is provided, so that implementability of the solution is enhanced.

In a possible implementation of the first aspect, that the control plane function sends the IP address and an IP address mask to the user plane function includes: The control plane function sends a session establishment request message to the user plane function, the session establishment request message includes an IP address attribute-value pair, and the IP address attribute-value pair carries the IP address and the IP address mask.

According to the routing management method provided in the embodiments of this application, the control plane function may send the IP address and the IP address mask to the user plane function by using the session establishment request message. This provides a specific manner of sending the information used to identify the IP address segment, so that implementability of the solution is enhanced.

In a possible implementation of the first aspect, that the control plane function sends the IP address and an IP address mask to the user plane function includes: The control plane function sends a session establishment request message to the user plane function. The session establishment request message includes an IP address attribute-value pair and an IP address mask attribute-value pair, the IP address attribute-value pair carries the IP address, and the IP address mask attribute-value pair carries the IP address mask.

According to the routing management method provided in the embodiments of this application, another specific manner in which the control plane function sends the IP address and the IP address mask to the user plane function by using the session establishment request message is provided, so that flexibility of solution implementation is improved.

In a possible implementation of the first aspect, that the control plane function sends information used to identify the IP address segment to a user plane function includes: The control plane function sends the IP address segment to the user plane function by using a node-level message.

According to the routing management method provided in the embodiments of this application, the control plane function may directly send the IP address segment to the user plane function by using the node-level message, so that flexibility of sending the IP address segment is improved.

In a possible implementation of the first aspect, that the control plane function sends the IP address segment to the user plane function by using a node-level message includes: The control plane function sends an IP address segment delivery request message to the user plane function. The IP address segment delivery request message carries the IP address segment.

According to the routing management method provided in the embodiments of this application, the IP address segment may be sent by using the IP address segment delivery request message. This provides a specific manner of sending the IP address segment, so that implementability of the solution is enhanced.

In a possible implementation of the first aspect, that the control plane function sends the IP address segment to the user plane function by using a node-level message includes: The control plane function sends an association update request message to the user plane function. The association update request message carries the IP address segment.

According to the routing management method provided in the embodiments of this application, the IP address segment may be carried in an existing association update request message, so that flexibility of solution implementation is improved.

In a possible implementation of the first aspect, after that the control plane function sends information used to identify the IP address segment to a user plane function, the method further includes: If all sessions associated with the IP address segment are deleted, the control plane function sends an address segment delivery request message to the user plane function. The address segment delivery request message is used to indicate the user plane function to delete the routing policy.

According to the routing management method provided in the embodiments of this application, after all sessions corresponding to an address segment are deleted, the control plane function may further indicate, by using the address segment delivery request message, the user plane function to delete the routing policy, so that implementability of the solution is improved.

A second aspect of the embodiments of this application provides a routing management method, including: A user plane function receives information that is used to identify an IP address segment and that is sent by a control plane function. The IP address segment is used to assign an IP address to user equipment, and the user plane function advertises a routing policy based on the IP address segment.

When the user equipment initiates a session establishment process, the control plane function selects the user plane function for the user equipment, and assigns the IP address to the user equipment. After the control plane function determines the IP address segment used to assign the IP address to the user equipment, the control plane function may send the information used to identify the IP address segment to the user plane function. The user plane function receives the information that is used to identify the IP address segment and that is sent by the control plane function, and advertises the routing policy based on the IP address segment. In this way, the user plane function receives and processes a packet that is sent to a destination address and that belongs to the IP address segment. This avoids abnormal routing policies of some users caused by inconsistency between a mask length of the IP address segment assigned by the control plane function and an agreed mask length of an advertised routing policy.

In a possible implementation of the second aspect, that the user plane function receives information that is used to identify an IP address segment and that is sent by a control plane function includes: The user plane function receives the IP address and an IP address mask that are sent by the control plane function.

According to the routing management method provided in the embodiments of this application, a specific manner in which the user plane function receives the information used to identify the IP address segment is provided, so that implementability of the solution is enhanced.

In a possible implementation of the second aspect, that the user plane function receives the IP address and an IP address mask that are sent by the control plane function includes: The user plane function receives a session establishment request message sent by the control plane function. The session establishment request message includes an IP address attribute-value pair, and the IP address attribute-value pair carries the IP address and the IP address mask.

According to the routing management method provided in the embodiments of this application, the user plane function may receive the IP address and the IP address mask by using the session establishment request message. This provides a specific manner of receiving the information used to identify the IP address segment, so that implementability of the solution is enhanced.

In a possible implementation of the second aspect, that the user plane function receives the IP address and an IP address mask that are sent by the control plane function includes: The user plane function receives a session establishment request message sent by the control plane function. The session establishment request message includes an IP address attribute-value pair and an IP address mask attribute-value pair, the IP address attribute-value pair carries the IP address, and the IP address mask attribute-value pair carries the IP address mask.

According to the routing management method provided in the embodiments of this application, another specific manner in which the user plane function receives the IP address and the IP address mask by using the session establishment request message is provided, so that flexibility of solution implementation is improved.

In a possible implementation of the second aspect, that the user plane function receives information that is used to identify an IP address segment and that is sent by a control plane function includes: The user plane function receives a node-level message that is sent by the control plane function and that carries the IP address segment.

According to the routing management method provided in the embodiments of this application, the user plane function may directly receive the IP address segment by using the node-level message, so that flexibility of receiving the IP address segment is improved.

In a possible implementation of the second aspect, that the user plane function receives a node-level message that is sent by the control plane function and that carries the IP address segment includes: The user plane function receives an IP address segment delivery request message sent by the control plane function. The IP address segment delivery request message carries the IP address segment.

According to the routing management method provided in the embodiments of this application, the IP address segment may be carried by using the IP address segment delivery request message. This provides a specific manner of receiving the IP address segment, so that implementability of the solution is enhanced.

In a possible implementation of the second aspect, that the user plane function receives a node-level message that is sent by the control plane function and that carries the IP address segment includes: The user plane function receives an association update request message sent by the control plane function. The association update request message carries the IP address segment.

According to the routing management method provided in the embodiments of this application, the IP address segment may be received in an existing association update request message, so that flexibility of solution implementation is improved.

In a possible implementation of the second aspect, after that the user plane function receives information that is used to identify an IP address segment and that is sent by a control plane function, the method further includes: The user plane function receives an address segment delivery request message sent by the control plane function, and the user plane function deletes the routing policy based on the address segment delivery request message.

According to the routing management method provided in the embodiments of this application, after all sessions corresponding to an address segment are deleted, the user plane function may receive the address segment delivery request message sent by the control plane function, and deletes the routing policy based on the message, so that implementability of the solution is improved.

In a possible implementation of the second aspect, after that the user plane function advertises a routing policy based on the IP address segment, the method further includes: If all sessions associated with the IP address segment are deleted, the user plane function deletes the address segment routing policy.

According to the routing management method provided in the embodiments of this application, after all sessions corresponding to the address segment are deleted, the user plane function may directly delete the routing policy, so that diversity of solution implementation is increased.

A third aspect of the embodiments of this application provides a control plane function. The control plane function has a function of implementing the routing management method in any one of the first aspect or the possible implementations of the first aspect. The function may be implemented by hardware, or may be implemented by hardware executing corresponding software. The hardware or the software includes one or more modules corresponding to the foregoing function.

In a possible design, a structure of the control plane function includes a processing unit and a communications unit. The processing unit is configured to support the control plane function in performing a corresponding function in the foregoing method. The communications unit is configured to support communication between the control plane function and another device. The control plane function may further include a storage unit. The storage unit is configured to couple with the processing unit, and stores program instructions and data that are necessary for the control plane function. In an example, the processing unit may be a processor, the communications unit may be a transceiver, and the storage unit may be a memory.

A fourth aspect of the embodiments of this application provides a user plane function. The user plane function has a function of implementing the routing management method in any one of the second aspect or the possible implementations of the second aspect. The function may be implemented by hardware, or may be implemented by hardware executing corresponding software. The hardware or the software includes one or more modules corresponding to the foregoing function.

In a possible design, a structure of the user plane function includes a processing unit and a communications unit. The processing unit is configured to support the user plane function in performing a corresponding function in the foregoing method. The communications unit is configured to support communication between the user plane function and another device. The user plane function may further include a storage unit. The storage unit is configured to couple with the processing unit, and stores program instructions and data that are necessary for the user plane function. In an example, the processing unit may be a processor, the communications unit may be a transceiver, and the storage unit may be a memory.

A fifth aspect of the embodiments of this application provides a control plane function, including a processor, an input/output device, and a bus. The processor and the input/output device are separately connected to the bus. The processor is configured to execute instructions to perform the routing management method in any one of the first aspect or the possible implementations of the first aspect.

A sixth aspect of the embodiments of this application provides a user plane function, including a processor, an input/output device, and a bus. The processor and the input/output device are separately connected to the bus. The processor is configured to execute instructions to perform the routing management method in any one of the second aspect or the possible implementations of the second aspect.

A seventh aspect of the embodiments of this application provides a computer program product. The computer program product includes computer program instructions, and the computer program instructions may be loaded by a processor to implement the routing management method in any one of the first aspect or the possible implementations of the first aspect.

An eighth aspect of the embodiments of this application provides a computer program product. The computer program product includes computer program instructions, and the computer program instructions may be loaded by a processor to implement the routing management method in any one of the second aspect or the possible implementations of the second aspect.

A ninth aspect of the embodiments of this application provides a computer-readable storage medium. The computer-readable storage medium stores instructions, and when the instructions are run on a computer, the instructions are configured to perform the routing management method in any one of the first aspect or the possible implementations of the first aspect.

A tenth aspect of the embodiments of this application provides a computer-readable storage medium. The computer-readable storage medium stores instructions, and when the instructions are run on a computer, the instructions are configured to perform the routing management method in any one of the second aspect or the possible implementations of the second aspect.

An eleventh aspect of the embodiments of this application provides a communications system. The communications system includes the control plane function provided in the third aspect or the fifth aspect and the user plane function provided in the fourth aspect or the sixth aspect.

In a possible design, the communications system may further include another device that interacts with the control plane function in the solution provided in the embodiments of this application.

In another possible design, the communications system may further include another device that interacts with the user plane function in the solution provided in the embodiments of this application.

It can be learned from the foregoing technical solutions that according to the routing management method and the apparatus provided in the embodiments of this application, after the control plane function determines the IP address segment used to assign the IP address to the user equipment, the control plane function may send the IP address segment to the user plane function, and the user plane function may advertise the routing policy based on the IP address segment. In this way, the user plane function receives and processes a packet that is sent to a destination address and that belongs to the IP address segment. This avoids abnormal routing policies of some users caused by inconsistency between a mask length of the IP address segment assigned by the control plane function and an agreed mask length of an advertised routing policy.

DESCRIPTION OF EMBODIMENTS

Figure 1:
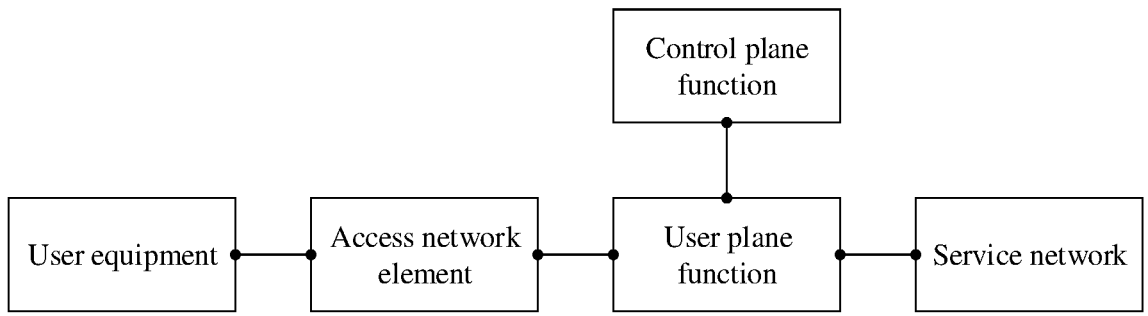
FIG. 1 is a schematic diagram of an application scenario according to an embodiment of this application.

Embodiments of this application provide a routing management method, used to resolve a problem that downlink routing policies of some users are abnormal in a scenario in which a user plane is separated from a control plane.

It should be noted that the IP address in the embodiments of this application may be an internet protocol version 4 (IPv4) address, or may be an internet protocol version 6 (IPv6) address. This is not limited herein.

The IPv4 address is a 32-bit binary number comprising a network identifier and a host identifier. An IP address can be divided into a network address and a host address by a subnet mask (subnet mask), also referred to as a network mask or an address mask. The value can be expressed in either of the following ways:

(1) Decimal notation: The network mask is "e.f.g.h", where e, f, g, and h are decimal integers ranging from 0 to 255, for example, 255.255.255.0.

(2) Mask length notation: A decimal number is used to indicate a quantity of consecutive 1s in a binary address mask. For example, 20 in 10.1.1.1/20 indicates that first 20 bits of the address mask are 1.

An IPv6 address is a 128-bit binary number consisting of a network prefix and an interface identifier. The network prefix is equivalent to the network identifier in the IPv4 address, and the interface identifier is equivalent to the host identifier in the IPv4 address. Usually, a network IP address prefix length is used for division. For example, 64 in 2001:A304:6101:1::EO:F726:4E58/64 indicates that the network prefix is 64 bits.

An IP address mask in the embodiments of this application may have a plurality of forms, including the subnet mask in the decimal notation in the IPv4 address, the mask length in the mask length notation in the IPv4 address, or the prefix length in the IPv6 address. A form of the IP address mask is not limited in the embodiments of this application.

It may be understood that the IP address mask and the IP address may be used to indicate an address segment. For example, an IP address segment is represented as "203.0.113.0/24", indicating 256 IP addresses in a range from 203.0.113.0 to 203.0.113.255.

The following first describes some possible application scenarios related to the technical solutions in the embodiments of this application by using an example with reference to FIG. 1. It should be noted that this solution is applicable to a system in which a user plane (UP) is separated from a control plane (CP). Referring to FIG. 1, a schematic diagram of an application scenario according to the embodiments of this application, including user equipment, an access network element, a user plane function, a control plane function, and a service network.

The user plane function and the control plane function in the embodiments of this application may have different existence forms in different communications systems.

In a possible design, a core network control plane (next generation control plane, NG-CP) function and a 5G core network user plane (next generation user plane, NG-UP) function exist in a 5th generation mobile communications technology (5G). The NG-CP and the NG-UP interact with each other through a reference point between the SMF and the UPF in the 5G architecture (reference point between the SMF and the UPF, N4).

In another possible design, a packet data network gateway (PGW) in an evolved packet core (EPC) is split into a PGW-C and a PGW-U, and a serving gateway (SGW) is split into an SGW-C and an SGW-U. The PGW-C and the SGW-C may be separately deployed, or may be deployed as a packet gateway control plane function (GW-C) in a centralized manner, namely, a control plane function. Similarly, the PGW-U and the SGW-U may be separately deployed, or may be deployed as a packet gateway user plane function (GW-U) in a centralized manner, namely, a user plane function. The GW-C interacts with the GW-U EPC through an interface between the control plane and the user plane of EPC (Sx INTERFACE).

In the system shown in FIG. 1, one control plane function may be corresponding to one or more user plane functions, and one user plane function may be corresponding to one or more control plane functions. This is not limited herein. Because the user plane is separated from the control plane, the user plane function cannot learn of a mask length used when the control plane function assigns an IP address segment, and the user plane function advertises an address segment routing policy only based on a preset or agreed mask length. When a mask length of an IP address segment in a plurality of IP address segments associated with the user plane function is inconsistent with the mask length of an advertised routing policy, that is, a range of an associated IP address segment is inconsistent with a range of an IP address segment of the advertised routing policy, route advertisement of some IP addresses is disordered. For example, when the user plane function receives data that should be sent to another user plane function, routing policies of some users are abnormal.

Figure 2:
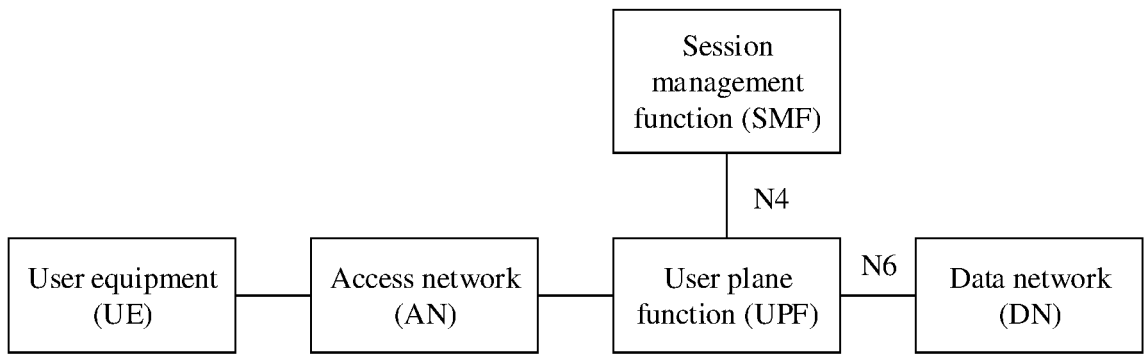
FIG. 2 is an architectural diagram of a system according to an embodiment of this application.

The following describes a schematic diagram of a specific system in a CU deployment scenario with separated control and user planes. Referring to FIG. 2, a schematic diagram of a 5G system architecture includes user equipment (UE), an access network (AN), a session management function (SMF), a user plane function (UPF), and a data network (DN). An N4 interface is used between the SMF and the UPF, and an N6 interface is used between the UPF and the DN.

The UE performs data transmission with the DN through the access network. The SMF is a control plane function, and is responsible for: (1) session establishment, modification, and release; (2) UE IP assignment management; (3) selecting and controlling the UPF for a session. The UPF is a user plane function, and is mainly responsible for routing and forwarding of a data packet.

When the UE initiates a session establishment process, the SMF selects the UPF for the UE and assigns an IP address from an IP address segment associated with the UPF to the UE. Then, the SMF initiates a session establishment request message to the UPF through the N4 interface, to implement the session establishment procedure.

When assigning the IP address to the UE, the SMF first determines whether an idle IP address exists in an IP address segment assigned to the UPF in an IP address pool corresponding to the UE. If the idle IP address exists, the SMF assigns the IP address from the IP address segment. If no idle IP address exists, the SMF applies for an IP address segment from the IP address pool based on a preset or agreed route mask, and binds the IP address segment to the UPF. Then, the SMF assigns an IP address from the IP address segment to the user equipment.

For an address segment, when a first session is established, the UPF advertises a routing policy of a downlink packet to the DN through the N6 interface. The routing policy defines that all IP packets whose destination addresses are IP addresses or address segments need to be sent to the UPF for processing. When a last session is deleted, the UPF deletes the routing policy.

In this embodiment and the following embodiments, the routing management method is described by using the 5G system architecture as an example.

Figure 3:
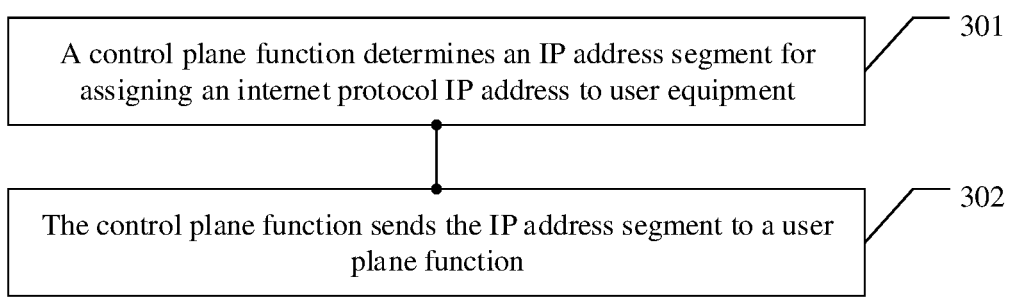
FIG. 3 is a schematic diagram of an embodiment of a routing management method according to an embodiment of this application.

Based on the system architecture shown in FIG. 1, referring to FIG. 3, the embodiments of this application provide a routing management method to resolve a problem that a routing policy of a user is abnormal. Based on the system architecture shown in FIG. 2, FIG. 3 is a schematic diagram of an embodiment of the routing management method according to the embodiments of this application.

301. A control plane function determines an IP address segment for assigning an IP address to UE.

When the UE initiates a session establishment process, the control plane function selects a user plane function for the UE, and assigns an IP address to the UE. That the control plane function assigns an IP address to the UE includes: Determine the IP address segment for assigning the IP address to the UE, and determine an IP address from the IP address segment.

The control plane function first determines whether an idle IP address exists in the IP address segment assigned to the user plane function. If the idle IP address exists, the control plane function determines to assign the IP address for the UE from the IP address segment. If no idle IP address exists, the control plane function applies for an IP address segment from an address pool based on a preset or agreed route mask, and binds the IP address segment to the user plane function. Then, the control plane function determines to assign an IP address to the user equipment from the applied IP address segment.

302. The control plane function sends information used to identify the IP address segment to the user plane function.

After the control plane function determines the IP address segment for assigning the IP address to the UE, the control plane function sends the information used to identify the IP address segment to the user plane function.

Optionally, the control plane function sends the IP address and an IP address mask of the UE to the user plane function.

Optionally, the control plane function sends a node-level message to the user plane function, and the node-level message carries the IP address segment. The node-level message is a message that is irrelevant to a session of specific UE, and is used for synchronization of a policy and information between a control plane function and a user plane function.

In the routing management method provided in the embodiments of this application, after the control plane function determines the IP address segment for assigning the IP address to the user equipment, the control plane function sends the information used to identify the IP address segment to the user plane function. Therefore, the user plane function may advertise the routing policy based on the IP address segment. The user plane function receives a packet whose destination address belongs to the IP address segment, so that an abnormal routing policy of the IP address can be avoided.

Figure 4:
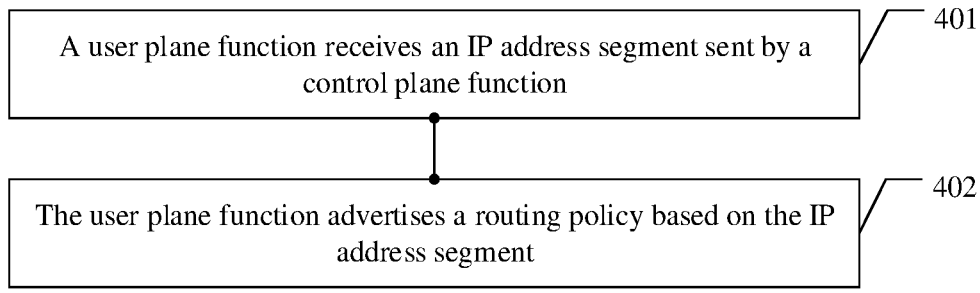
FIG. 4 is a schematic diagram of another embodiment of a routing management method according to an embodiment of this application.

Based on the system architecture shown in FIG. 1, referring to FIG. 4, a schematic diagram of an embodiment of the routing management method according to the embodiments of this application.

401. A user plane function receives information used to identify an IP address segment sent by a control plane function.

When UE initiates a session establishment process, the control plane function selects the user plane function for the UE, and assigns an IP address. The user plane function receives information that is used to identify an IP address segment for assigning the IP address to the user equipment and that is sent by the control plane function.

Optionally, the user plane function receives the IP address and an IP address mask of the UE that are sent by the control plane function.

Optionally, the user plane function receives a node-level message sent by the control plane function, and the node-level message carries the IP address segment.

402. The user plane function advertises a routing policy based on the IP address segment.

The user plane function advertises the routing policy based on the IP address segment, that is, the user plane function needs to receive all packets whose destination addresses belong to the IP address segment.

In the routing management method provided in the embodiments of this application, the user plane function receives the IP address segment in which the control plane function assigns the IP address to the user equipment. The user plane function may advertise the routing policy based on the IP address segment. The user plane function receives the packet whose destination address belongs to the IP address segment, so that an abnormal routing policy of the IP address can be avoided.

Figure 5:
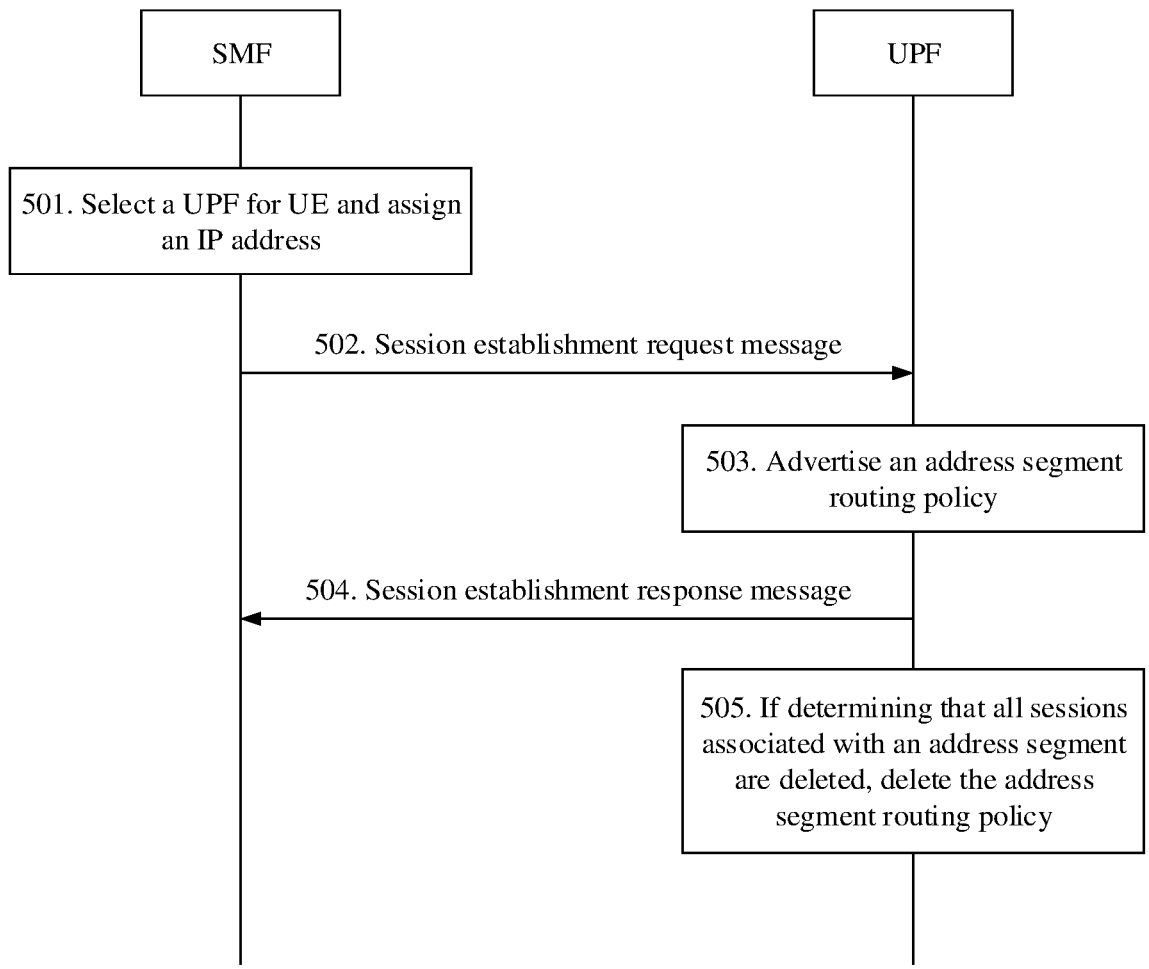
FIG. 5 is an interactive flowchart of an embodiment of a routing management method according to an embodiment of this application.

Based on the system architecture shown in FIG. 2, referring to FIG. 5, an interactive flowchart of an embodiment of the routing management method according to the embodiments of this application.

501. An SMF selects a UPF for UE and assigns an IP address.

When the UE initiates a session establishment process, the SMF selects the UPF for the UE and assigns the IP address to the UE. Before assigning the IP address to the UE, the SMF determines an IP address segment for assigning the IP address to the UE.

Optionally, the SMF determines whether an idle IP address exists in the IP address segment assigned to the UPF. If the idle IP address exists, the SMF determines to assign the IP address to the UE from the IP address segment.

For example, the SMF assigns an address segment to the UPF: an IP address 10.10.10.1, where a mask length of the IP address segment is 24, indicating 255 IP addresses in an IP address range of 10.10.10.1 to 10.10.10.255. If there are current idle IP addresses in the 255 IP addresses, the SMF may assign an IP address, for example, 10.10.10.20, to the UE from the idle IP addresses.

Optionally, if the SMF determines that no idle IP address exists in the IP address segment assigned to the UPF, the SMF applies for an IP address segment from an address pool based on a preset or agreed route mask, and binds the IP address segment to the UPF. Then, the SMF determines to assign an IP address to the user equipment from the applied IP address segment.

For example, if all IP addresses in the address segment 10.10.10.1 to 10.10.10.255 assigned by the SMF to the UPF have been assigned to another user equipment, the SMF may apply for an IP address segment based on the preset or agreed route mask, and bind the IP address segment to the UPF. If a preset mask length is 24, the SMF applies for an address segment ranging from 10.10.1.1 to 10.10.1.255 from the address pool, and assigns an IP address 10.10.1.25 to the UE from the 255 IP addresses.

502. The SMF sends a session establishment request message to the UPF.

After the SMF selects the UPF for the UE and assigns the IP address to the UE, the SMF sends the session establishment request message to the UPF through the N4 interface.

| Number | Number of bits | | | | | | | |
|---|---|---|---|---|---|---|---|---|
| of byte | 8 | 7 | 6 | 5 | 4 | 3 | 2 | 1 |
| 1 to 2 | Type = 93 (decimal) | | | | | | | |
| 3 to 4 | Length = n | | | | | | | |
| 5 | Standby | Standby | Standby | V4 mask | V6 mask | S/D | V4 | V6 |
| m to (m + 3) | IPv4 address | | | | | | | |
| p to (p + 15) | IPv6 address | | | | | | | |
| p + 16 | IPv4 address mask length | | | | | | | |
| p + 17 | IPv6 address mask length | | | | | | | |
| k to (n + 4) | Appears in clearly specified cases | | | | | | | |

In a fifth byte, if a first bit "V6" is set to "1", an IPv6 address field appears in an IP address of the UE. Otherwise, the IPv6 address field does not exist. If a second bit "V4" is set to "1", an IPv4 address field appears in the IP address of the UE. Otherwise, the IPv4 address field does not exist. If a third bit "S/D" is set to "0", it indicates a source IP address. If the third bit "S/D" is set to "1", it indicates a destination IP address. If a fourth bit "V6 mask" is set to "1", an IPv6 address mask length field should appear in an IP mask length address of the UE. Otherwise, the IPv6 address mask length field does not exist. If a fifth bit "V4 mask" is set to "1", an IPv4 address mask length field should appear in the IP mask length address of the UE. Otherwise, the IPv4 address mask length field does not exist. A sixth bit to an eighth bit are set to 0, and are reserved for future use.

Optionally, the session establishment request message includes an IP address AVP of the UE. In the embodiments of this application, an IP address mask AVP of the UE is newly added. The IP address AVP of the UE carries IP address information, and the IP address mask AVP of the UE carries IP address mask information. Referring to the following table for an example of the IP address mask AVP of the UE.

| Information element | Attribute | Condition/Comment | Application interface | | | | Information element type |
|---|---|---|---|---|---|---|---|
| | | | Sxa | Sxb | Sxc | N4 | |
| IP address mask of UE | Optional | This information element will be displayed on the IP address mask | — | X | — | X | IP address mask of UE |

The session establishment request message carries the IP address of the UE and information of the IP address segment for assigning the IP address to the UE, for example, an IP address mask of the UE.

Optionally, the session establishment request message includes an IP address attribute-value pair (AVP). In the embodiments of this application, the IP address AVP is extended, and the IP address mask of the UE is added. Referring to the following table for an example of the IP address AVP.

The Sxa is an interface between a control plane and a user plane of the SGW. The Sxb is an interface between the control plane and the user plane of the PGW. The Sxc is an interface between the control plane and the user plane of a traffic detection function (TDF). The N4 is an interface between the SMF and the UPF. The X indicates that the interface is used, and "-" indicates that the interface is not used.

A form in which the SMF sends the IP address and the IP address mask of the UE to the UPF is not limited herein.

503. The UPF advertises an address segment routing policy.

After receiving the IP address and the IP address mask that are of the UE and that are sent by the SMF, the UPF may determine an IP address segment based on the IP address and the IP address mask. The IP address segment is an address segment bound by the SMF to the UPF. The UPF advertises the address segment routing policy to notify routing nodes that all downlink packets whose destination addresses belong to the address segment need to be sent to the UPF.

It should be noted that for an address segment associated between the SMF and the UPF, only when receiving the IP address and the IP address mask for the first time, the UPF determines an IP address segment and advertises the address segment routing policy based on the IP address and the IP address mask.

504. The UPF sends a session establishment response message to the SMF.

After receiving the session establishment request message sent by the SMF, the UPF returns a session establishment response message to the SMF, to complete the session establishment process.

505. If determining that all sessions associated with the IP address segment are deleted, delete the address segment routing policy.

After the UPF advertises the address segment routing policy based on the IP address and the IP address mask of the UE, if the UPF determines that all sessions associated with the IP address segment determined by the IP address and the IP address mask of the UE are deleted, the UPF deletes the address segment routing policy, and sends information about deleting the routing policy to each routing node.

In the routing management method provided in the embodiments of this application, after the SMF determines the IP address segment for assigning the IP address to the UE, the SMF sends the IP address and the IP address mask of the UE to the user plane function. Therefore, the user plane function may advertise the routing policy based on the IP address and the IP address mask of the UE, and may determine the IP address segment based on the IP address and the IP address mask. The user plane function receives a packet whose destination address belongs to the IP address segment, so that an abnormal routing policy of the IP address can be avoided.

Figure 6:
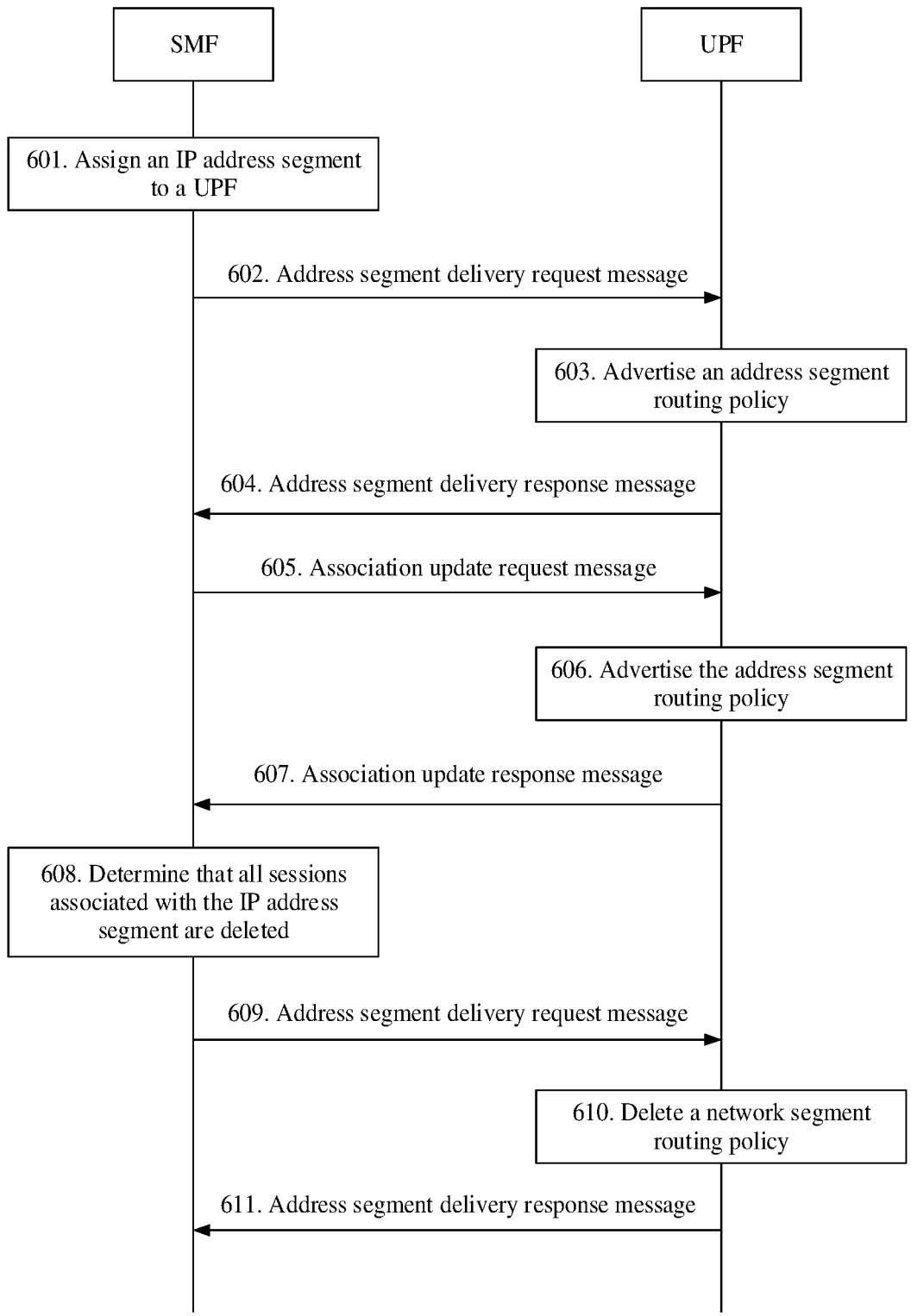
FIG. 6 is an interactive flowchart of another embodiment of a routing management method according to an embodiment of this application.

Based on the system architecture shown in FIG. 2, referring to FIG. 6, an interactive flowchart of another embodiment of the routing management method according to the embodiments of this application.

601. An SMF assigns an IP address segment to a UPF.

When UE initiates a session establishment process, the SMF first selects the UPF for the UE and assigns an IP address to the UE. Before assigning the IP address, the SMF needs to assign the IP address segment to the UPF.

Optionally, when the SMF is associated with the UPF for the first time, the SMF assigns an IP address segment from an address pool based on a preset address segment routing mask or an agreed address segment routing mask, binds the IP address segment to the UPF, and then assigns an IP address of the UE to the UE from the IP address segment of the UE.

Optionally, when no idle IP address exists in the IP address segment assigned by the UPF, the SMF assigns an IP address segment from the address pool based on the preset address segment routing mask or the agreed address segment routing mask, binds the IP address segment to the UPF, and then assigns the IP address of the UE to the terminal user from the IP address segment of the UE.

It should be noted that the SMF may send the IP address segment to the UPF in a plurality of forms. The following separately describes the forms. Optionally, for carrying information about the IP address segment in a newly added node-level message, refer to step 602 to step 604. Optionally, for carrying information about the IP address segment in an original node-level message, refer to step 605 to step 607. A node-level message between the SMF and the UPF is a message that is irrelevant to a session of specific UE, and is used to transfer a policy and information between network elements.

602. The SMF sends an address segment delivery request message to the UPF.

After the SMF assigns the IP address segment to the UPF, the SMF sends the address segment delivery request message to the UPF. The address segment delivery request message is the newly added node-level message in the embodiments of this application. The address segment delivery request message carries information used to identify the IP address segment assigned by the SMF to the UPF.

Referring to the following table for an example of the address segment delivery request message in the embodiments of this application.

| Information element | Attribute | Condition/Comment | Information element type |
|---|---|---|---|
| Node identification number | Compulsory | This information element contains a unique identifier of the sending node | Node identification number |
| IP address mask of UE | Compulsory | If this information element exists, this information element identifies the IP address segment of the UE of the UPF | IP address segment of UE |

It may be understood that, in the embodiments of this application, a message for sending an IP address segment channel is referred to as the address segment delivery request message, and is essentially a node-level message that may carry IP address segment information. A message name is not limited herein.

603. The UPF advertises an address segment routing policy.

The UPF advertises the address segment routing policy based on the IP address segment information carried in the address segment delivery request message. The routing policy defines that the UPF needs to receive all packets whose destination addresses belong to the IP address segment.

604. The UPF sends an address segment delivery response message to the SMF.

After receiving the address segment delivery request message, the UPF may return the address segment delivery response message to the SMF through the N4 interface.

Referring to the following table for an example of the address segment delivery response message in the embodiments of this application.

| Information element | Attribute | Condition/Comment | Information element type |
|---|---|---|---|
| Node identification number | Compulsory | This information element contains a unique identifier of the sending node | Node identification number |
| Cause | Compulsory | This information element indicates whether a corresponding request message is accepted or rejected | Cause |

It may be understood that step 602 to step 604 are optional steps. If step 605 to step 607 are performed, step 602 to step 604 may not be performed.

605. The SMF sends an association update request message to the UPF.

After the SMF assigns the IP address segment to the UPF, the SMF sends the association update request message to the UPF. The association update request message is a node-level message. The association update request message carries the information about the IP address segment assigned by the SMF to the UPF.

Referring to the following table for an example of the association update request message in which the information of the IP address segment is carried in the embodiments of this application.

| Information element | Attribute | Condition/Comment | Information element type |
|---|---|---|---|
| IP address segment of UE | Optional | If this information element exists, this information element indicates the IP address segment of the UE of the UPF | IP address segment of UE |

It may be understood that the SMF may send the IP address segment information by using the association update request message, or may send the IP address segment information by using another node-level message. This is not limited herein.

606. The UPF advertises the address segment routing policy.

The UPF advertises the address segment routing policy based on the IP address segment information carried in the association update request message. The routing policy defines that the UPF needs to receive all packets whose destination addresses belong to the IP address segment.

607. The UPF sends an association update response message to the SMF.

After receiving the association update request message, the UPF may return the association update response message to the SMF.

It may be understood that step 605 to step 607 are optional steps. If step 602 to step 604 are performed, step 605 to step 607 may not be performed.

608. The SMF determines that all sessions associated with the IP address segment are deleted.

The SMF may determine whether the session associated with the IP address segment exists, in other words, the SMF may determine whether all sessions associated with the IP address segment are deleted.

609. The SMF sends the address segment delivery request message to the UPF.

After the SMF determines that all sessions associated with the IP address segment are deleted, the SMF may send the address segment delivery request message to the UPF through the N4 interface. The address segment delivery request message is used to reclaim the IP address segment.

610. The UPF deletes the address segment routing policy.

After the UPF receives the address segment delivery request message sent by the SMF, the UPF deletes the address segment routing policy, and sends information about deleting the routing policy to each routing node.

611. The UPF sends the address segment delivery response message to the SMF.

After deleting the address segment routing policy, the UPF may return the address segment delivery response message to the SMF, to complete a reclaiming procedure of the IP address segment.

In the routing management method provided in the embodiments of this application, after the SMF determines the IP address segment assigned to the UPF, the SMF may send the IP address segment to a user plane function by using the node-level message. Therefore, the user plane function may advertise the routing policy based on the IP address segment. The user plane function receives the packet whose destination address belongs to the IP address segment, so that an abnormal routing policy of the IP address can be avoided.

Figure 7:
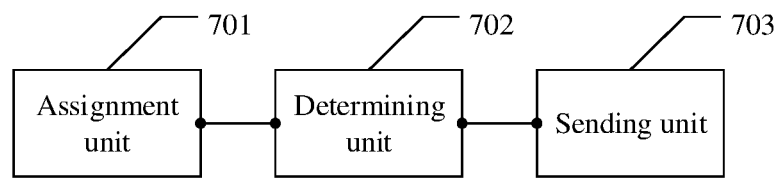
FIG. 7 is a schematic diagram of an embodiment of a control plane function according to an embodiment of this application.

The foregoing describes the routing management method, and the following describes an apparatus for implementing the routing management method. Referring to FIG. 7, a schematic diagram of an embodiment of a control plane function according to the embodiments of this application.

The control plane function provided in the embodiments of this application includes:

an assignment unit 701, configured to assign an internet protocol IP address to user equipment;

a determining unit 702, configured to determine an IP address segment, where the IP address belongs to the IP address segment; and a sending unit 703, configured to send information used to identify the IP address segment to a user plane function, where the IP address segment is used to advertise a routing policy.

The sending unit 703 is specifically configured to send the IP address and an IP address mask to the user plane function.

The sending unit 703 is specifically configured to send a session establishment request message to the user plane function. The session establishment request message carries the IP address and the IP address mask.

The sending unit 703 is specifically configured to send, by the control plane function, the IP address segment to the user plane function by using a node-level message.

The sending unit 703 is specifically configured to send an IP address segment delivery request message to the user plane function. The IP address segment delivery request message carries the IP address segment.

The sending unit 703 is specifically configured to send an association update request message to the user plane function. The association update request message carries the IP address segment.

The sending unit 703 is further configured to: if all sessions associated with the IP address segment are deleted, send an address segment delivery request message to the user plane function. The address segment delivery request message is used to indicate the user plane function to delete the routing policy. In the control plane function provided in the embodiments of this application, after a determining unit assigns the IP address segment of the IP address to the user equipment, the control plane function sends the IP address segment to the user plane function through a sending unit. Therefore, the user plane function may advertise the routing policy based on the IP address segment. The user plane function receives a packet whose destination address belongs to the IP address segment, so that an abnormal routing policy of the IP address can be avoided.

Figure 8:
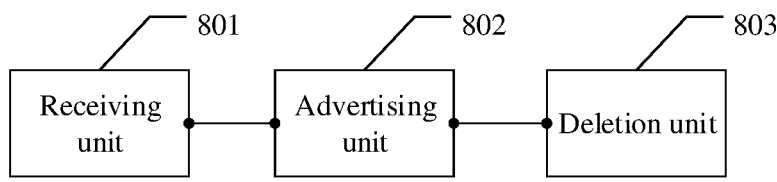
FIG. 8 is a schematic diagram of an embodiment of a user plane function according to an embodiment of this application.

Referring to FIG. 8, a schematic diagram of an embodiment of a user plane function according to the embodiments of this application.

The user plane function provided in the embodiments of this application includes:

a receiving unit 801, configured to receive information that is used to identify an IP address segment and that is sent by a control plane function, where the IP address segment is used to assign an IP address to user equipment; and an advertising unit 802, configured to advertise a routing policy based on the IP address segment.

The receiving unit 801 is specifically configured to receive the IP address and an IP address mask that are sent by the control plane function.

The receiving unit 801 is specifically configured to receive a session establishment request message sent by the control plane function. The session establishment request message carries the IP address and the IP address mask.

The receiving unit 801 is specifically configured to receive a node-level message that is sent by the control plane function and that carries the IP address segment.

The receiving unit 801 is specifically configured to receive an IP address segment delivery request message sent by the control plane function. The IP address segment delivery request message carries the IP address segment.

The receiving unit 801 is specifically configured to receive an association update request message sent by the control plane function. The association update request message carries the IP address segment.

The receiving unit 801 is further configured to receive an address segment delivery request message sent by the control plane function.

The user plane function further includes a deletion unit 803, configured to delete the routing policy based on the address segment delivery request message.

The deletion unit 803 is further configured to: if all sessions associated with the IP address segment are deleted, delete an address segment routing policy.

In the user plane function provided in the embodiments of this application, a receiving unit may receive the IP address segment in which the control plane function assigns the IP address to the user equipment. An advertising unit may advertise the routing policy based on the IP address segment. The user plane function receives a packet whose destination address belongs to the IP address segment, so that an abnormal routing policy of the IP address can be avoided.

Figure 9:
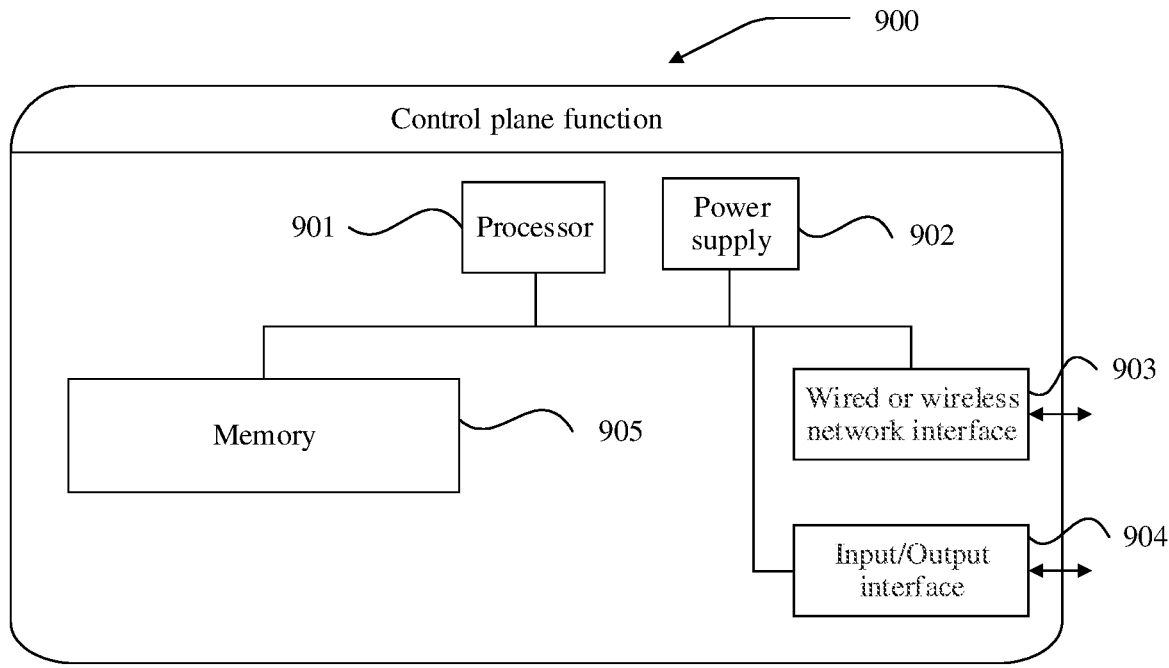
FIG. 9 is a schematic diagram of another embodiment of a control plane function according to an embodiment of this application.

Referring to FIG. 9, a schematic diagram of another embodiment of a control plane function according to the embodiments of this application.

The control plane function 900 may differ greatly due to different configurations or performance, and may include one or more processors 901 and memories 905. The memory 905 stores a program or data.

The memory 905 may be a volatile memory or a nonvolatile memory. The processor 901 may communicate with the memory 905, and executes, on the control plane function 900, a series of instructions in the memory 905.

The control plane function 900 may further include one or more power supplies 902, one or more wired or wireless network interfaces 903, and one or more input/output interfaces 904.

For a procedure performed by the processor 901 in the control plane function 900 in the embodiments, refer to the method procedure described in the foregoing method embodiments. Details are not described herein.

Figure 10:
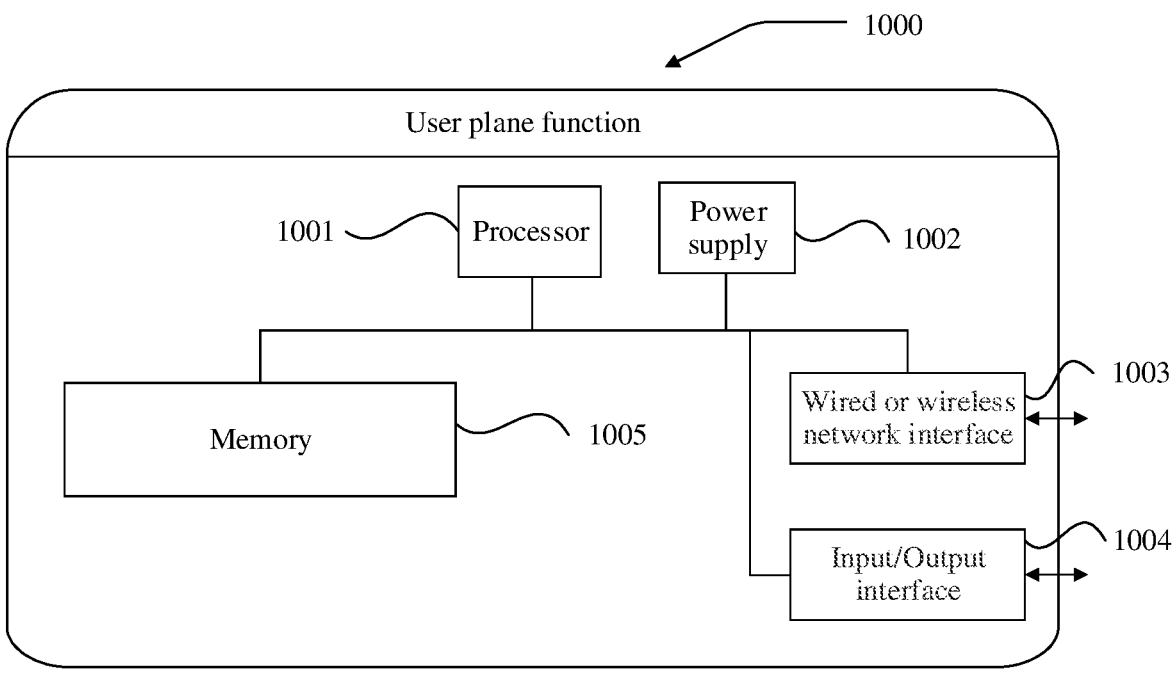
FIG. 10 is a schematic diagram of another embodiment of a user plane function according to an embodiment of this application.

Referring to FIG. 10, a schematic diagram of another embodiment of a user plane function according to the embodiments of this application.

The user plane function 1000 may differ greatly due to different configurations or performance, and may include one or more processors 1001 and memories 1005. The memory 1005 stores a program or data.

The memory 1005 may be a volatile memory or a nonvolatile memory. The processor 1001 may communicate with the memory 1005, and executes, on the user plane function 1000, a series of instructions in the memory 1005.

The user plane function 1000 may further include one or more power supplies 1002, one or more wired or wireless network interfaces 1003, and one or more input/output interfaces 1004.

For a procedure performed by the processor 1001 in the user plane function 1000 in the embodiments, refer to the method procedure described in the foregoing method embodiments. Details are not described herein.

Figure 11:
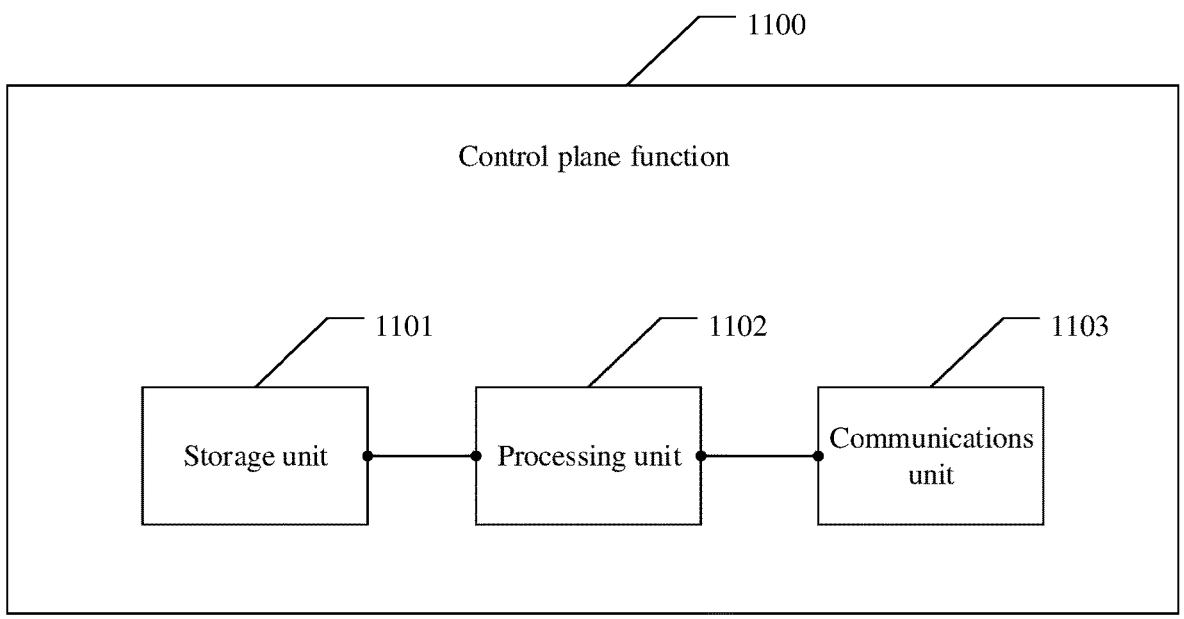
FIG. 11 is a schematic diagram of another embodiment of a control plane function according to an embodiment of this application.

When an integrated unit is used, FIG. 11 shows another possible schematic structural diagram of the control plane function in the foregoing embodiments. The control plane function 1100 may also implement a function of the control plane function in the routing management method shown in FIG. 3, FIG. 5 or FIG. 6.

The control plane function 1100 includes a processing unit 1102 and a communications unit 1103. The processing unit 1102 is configured to control and manage an action of the control plane function. For example, the processing unit 1102 is configured to support the control plane function in performing step 301 to step 302 in FIG. 3, step 501, step 502, and step 504 in FIG. 5, and step 601, step 604, step 605, step 607 to step 609 and step 611 in FIG. 6, and/or configured to perform another process of the technology described in this specification. The communications unit 1103 is configured to support communication between the control plane function and another network entity, for example, communication between the control plane function and a user plane function shown in FIG. 5 or FIG. 6. The control plane function may further include a storage unit 1101, configured to store program code and data of the control plane function.

Figure 12:
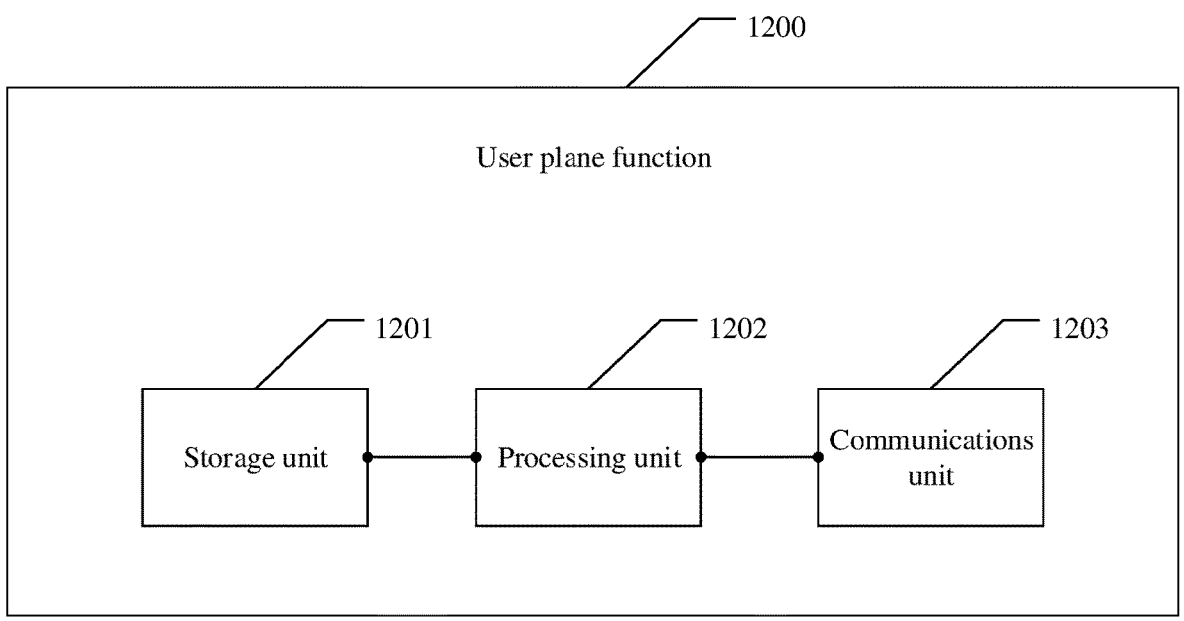
FIG. 12 is a schematic diagram of another embodiment of a user plane function according to an embodiment of this application.

When an integrated unit is used, FIG. 12 shows another possible schematic structural diagram of the user plane function in the foregoing embodiments. The user plane function 1200 may also implement a function of the user plane function in the routing management method shown in FIG. 4 to FIG. 6.

The user plane function 1200 includes a processing unit 1202 and a communications unit 1203. The processing unit 1202 is configured to control and manage an action of the user plane function. For example, the processing unit 1202 is configured to support the user plane function in performing step 401 to step 402 in FIG. 4, step 502 to step 505 in FIG. 5, and step 602 to step 607, and step 609 to step 611 in FIG. 6, and/or configured to perform another process of the technology described in this specification. The communications unit 1203 is configured to support communication between the control plane function and another network entity, for example, communication between the user plane function and a control plane function shown in FIG. 5 or FIG. 6. The user plane function may further include a storage unit 1201, configured to store program code and data of the user plane function.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in another manner. For example, the described apparatus embodiment is merely an example. For example, the unit division is merely logical function division, and there may be another division manner in actual implementation, for example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and is sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for indicating a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A routing management method comprising:
assigning, by a control plane function, an internet protocol (IP) address to user equipment;
determining, by the control plane function, an IP address segment, wherein the IP address belongs to the IP address segment; and
sending, by the control plane function, information used to identify the IP address segment to a user plane function, wherein the IP address segment is used to advertise a routing policy wherein:
the information used to identity the IP address segment comprises the IP address and an IP address mask; and the sending, by the control plane function, of the information used to identify the IP address segment to the user plane function comprises: sending, by the control plane function, of the IP address and the IP address mask to the user plane function; and the sending, by the control plane function, of the IP address and the IP address mask to the user plane function comprises: sending, by the control plane function, a session establishment request message to the user plane function, wherein the session establishment request message comprises an IP address attribute-value pair and an IP address mask attribute-value pair, the IP address attribute-value pair carries the IP address, and the IP address mask attribute-value pair carries the IP address mask.

2. A routing management method comprising:
assigning, by a control plane function, an internet protocol (IP) address to user equipment;
determining, by the control plane function, an IP address segment, wherein the IP address belongs to the IP address segment; and
sending, by the control plane function, information used to identify the IP address segment to a user plane function, wherein the IP address segment is used to advertise a routing policy wherein:
the information used to identify the IP address segment comprises the IP address and an IP address mask; and the sending, by the control plane function, of the information used to identify the IP address segment to the user plane function comprises: sending, by the control plane function, of the IP address and the IP address mask to the user plane function; and the sending, by the control plane function, of the IP address and the IP address mask to the user plane function comprises:
sending, by the control plane function, a session establishment request message to the user plane function, wherein the session establishment request message comprises an IP address attribute-value pair, and the IP address attribute-value pair carries the IP address and the IP address mask.

3. A routing management method comprising:
assigning, by a control plane function, an Internet protocol (IP) address to user equipment;
determining, by the control plane function, an IP address segment, wherein the IP address belongs to the IP address segment; and
sending, by the control plane function, information used to identify the IP address segment to a user plane function, wherein the IP address segment is used to advertise a routing policy; wherein:
the information used to identity the IP address segment comprises the IP address segment; and the sending, by the control plane function, of the information used to identify the IP address segment to the user plane function comprises: sending, by the affirm plane function, the IP address segment to the user plane function by using a node-level message; and the sending, by the control plane function, the IP address segment to the user plane function by using the node-level message comprises:
sending, by the control plane function, an IP address segment delivery request message to the user plane function, wherein the IP address segment delivery request message carries the IP address segment.

4. A routing management method comprising:
assigning, by a control plane function, an internet protocol (IP) address to user equipment;
determining, by the control plane function, an IP address segment, wherein the IP address belongs to the IP address segment; and
sending, by the control plane function, information used to identify the IP address segment to a user plane function, wherein the IP address segment is used to advertise a routing policy; wherein:
the information used to identity the IP address segment comprises the IP address segment; and the sending, by the control plane function, of the information used to identify the IP address segment to the user plane function comprises: sending, by the control plane function, the IP address segment to the user plane function by using a node-level message; and
the sending, by the control plane function, the IP address segment to the user plane function by using the node-level message comprises:
sending, by the control plane function, an association update request message to the user plane function, wherein the association update request message carries the IP address segment.

5. The method according to claim 1, wherein after the sending, by the control plane function, of the information used to identify the IP address segment to the user plane function, the method further comprises:
sending, by the control plane function, an address segment delivery request message to the user plane function as a result of all sessions associated with the IP address segment being deleted, wherein the address segment delivery request message is used to indicate the user plane function to delete the routing policy.

6. A routing management method comprising:
receiving, by a user plane function, information that is used to identify an IP address segment and that is sent by a control plane function, wherein the IP address segment is used to assign an IP address to user equipment; and
advertising, by the user plane function, a routing policy based on the IP address segment; wherein
the receiving, by the user plane function, of the information that is used to identify the IP address segment and that is sent by the control plane function comprises: receiving, by the user plane function, the IP address and an IP address mask that are sent by the control plane function; and
the receiving, by the user plane function, of the IP address and an IP address mask that are sent by the control plane function comprises: receiving, by the user plane function, a session establishment request message sent by the control plane function, wherein the session establishment request message comprises an IP address attribute-value pair, and the IP address attribute-value pair carries the IP address and the IP address mask.

7. The method according to claim 6, wherein after the receiving, by the user plane function, of the information that is used to identify the IP address segment and that is sent by the control plane function, the method further comprises:
receiving, by the user plane function, an address segment delivery request message sent by the control plane function; and
deleting, by the user plane function, the routing policy based on the address segment delivery request message.

8. A control plane device comprising:
storage memory configured to store program instructions; and
at least one processor configured to execute the program instructions from the storage memory such that the control plane device is at least configured to:
assign an internet protocol IP address to user equipment;
determine an IP address segment, wherein the IP address belongs to the IP address segment;
send information used to identify the IP address segment to a user plane function, wherein the IP address segment is used to advertise a routing policy,
send the IP address and an IP address mask to the user plane function; and
send a session establishment request message to the user plane function, wherein the session establishment request message comprises an IP address attribute-value pair and an IP address mask attribute-value pair, the IP address attribute-value pair carries the IP address, and the IP address mask attribute-value pair carries the IP address mask.

9. A user plane device comprising:
storage memory configured to store program instructions; and
at least one processor configured to execute the program instructions from the storage memory such that the user plane device is at least configured to:
receive information that is used to identify an IP address segment and that is sent by a control plane function, wherein the IP address segment is used to assign an IP address to user equipment;
advertise a routing policy based on the IP address segment;
receive the IP address and an IP address mask that are sent by the control plane function; and
receive a session establishment request message sent by the control plane function, wherein the session establishment request message comprises an IP address attribute-value pair and an IP address mask attribute-value pair, the IP address attribute-value pair carries the IP address, and the IP address mask attribute-value pair carries the IP address mask.

10. The user plane device according to claim 9, wherein the user plane device is further configured to:
receive a node-level message that is sent by the control plane function and that carries the IP address segment.

11. The user plane device according to claim 9, wherein the user plane device is further configured to:
receive an address segment delivery request message sent by the control plane function; and
the user plane device further comprises a first deletion unit, configured to delete the routing policy based on the address segment delivery request message.

* * * * *